United States Patent [19]

Kaneda

[11] Patent Number: 5,241,377
[45] Date of Patent: Aug. 31, 1993

[54] COMPACT IMAGER INCLUDING A PLURALITY OF PHOTODIODE ARRAYS

[75] Inventor: Osamu Kaneda, Itami, Japan

[73] Assignee: Mitsubishi Denki Kabushiki Kaisha, Tokyo, Japan

[21] Appl. No.: 793,142

[22] Filed: Nov. 18, 1991

[30] Foreign Application Priority Data

Jan. 11, 1991 [JP] Japan .................... 3-13998

[51] Int. Cl.$^5$ ............................................. H04N 9/07
[52] U.S. Cl. .............................. 358/48; 358/213.23; 257/215
[58] Field of Search .............. 358/41, 43, 44, 48, 358/211, 213.11, 213.23; 357/24 LR

[56] References Cited

U.S. PATENT DOCUMENTS

| | | | |
|---|---|---|---|
| 4,134,031 | 1/1979 | Weimer | 357/24 LR |
| 4,291,390 | 9/1981 | Stern et al. | 357/24 LR |
| 4,349,743 | 9/1982 | Ohba et al. | 358/48 |
| 4,453,177 | 6/1984 | Berger et al. | 358/48 |
| 4,528,595 | 7/1985 | Eouzan | 357/24 LR |
| 4,553,159 | 11/1985 | Moraillon | 358/48 |
| 4,590,390 | 5/1986 | Arques | 357/24 LR |
| 4,658,287 | 4/1987 | Chen | 358/48 |
| 4,847,692 | 7/1984 | Tabei | 358/213.11 |

Primary Examiner—James J. Groody
Assistant Examiner—Jeffrey Murrell
Attorney, Agent, or Firm—Leydig, Voit & Mayer

[57] ABSTRACT

An image sensor includes a plurality of photodiode arrays, each array including a plurality of photodiodes, the arrays being aligned in parallel and closely arranged, at least two charge transfer devices disposed parallel to and on opposite sides of the photodiode arrays. With this arrangement, the clearance between the respective photodiode arrays can be reduced and the charges generated by the photodiodes having shallower potential wells can be completely transferred at high speed.

7 Claims, 15 Drawing Sheets

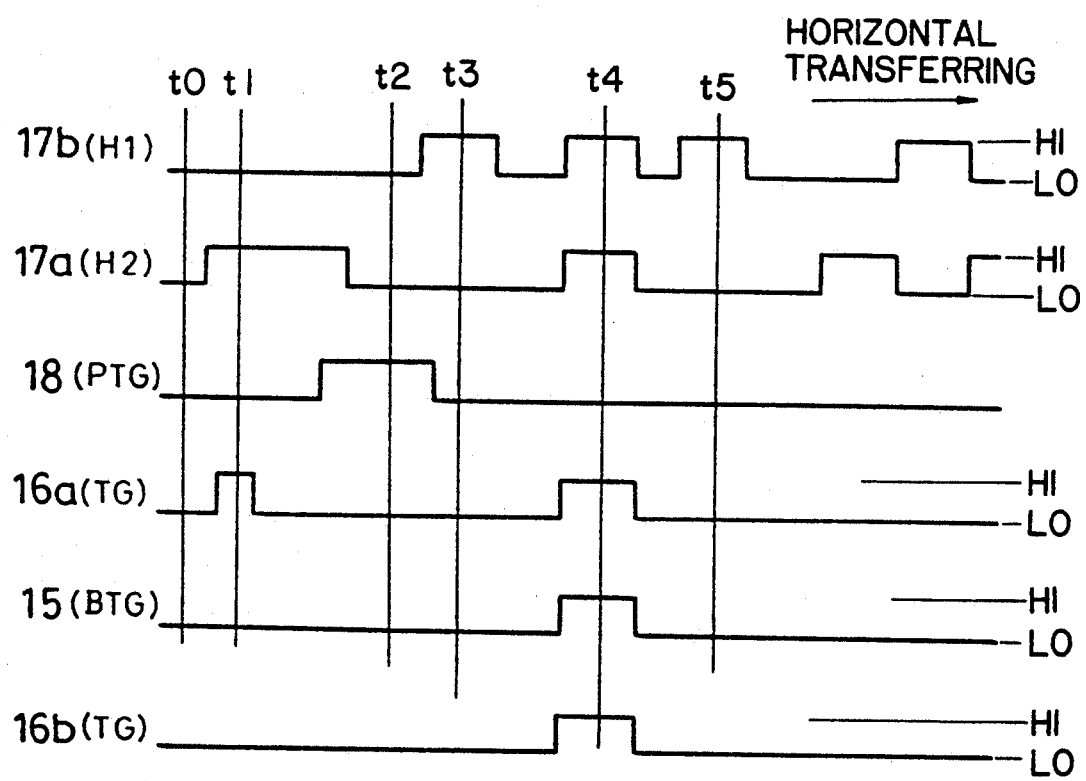

OUTPUT SIGNAL

COMPACT IMAGER INCLUDING A PLURALITY OF PHOTODIODE ARRAYS

FIELD OF THE INVENTION

The present invention relates to an image sensor which converts optical information into electric signals. More particularly it relates to reduction of the chip size of a linear image sensor comprising three photodiode arrays aligned adjacent to one another on the same chip in a subscanning direction.

BACKGROUND OF THE INVENTION

A linear image sensor is usually constituted by a single column of photo sensors such as photodiodes and it carries out only transverse scanning while vertical scanning is carried out mechanically or optically. The linear image sensor has been generally used for reading in a facsimile machine or an optical character recorder (OCR).

FIG. 14 is a diagram illustrating the construction of a prior art linear image sensor disclosed in the Japanese Patent Publication No.64-61163. In FIG. 14, reference characters R, G, and B designate photodiodes capable of receiving red signal light, green signal light, and blue signal light, respectively. A photodiode array 4 for detecting red signal light (hereinafter referred to as R) is constituted by a plurality of R photodiodes aligned in main scanning direction 10b. As well, a photodiode array 5 for detecting green light (hereinafter referred to as G) and a photodiode array 6 for detecting blue light (hereinafter referred to as B) are constituted by a plurality of G photodiodes and a plurality of B photodiodes, respectively, arranged in main scanning direction 10b. A B transfer part 3 successively reads out charges generated by the B photodiode array 6, a G transfer part 2 successively reads out charges generated by the G photodiode array 5, and an R transfer part 1 successively reads out charges generated by the R photodiode array 4. The R transfer part 1, the R photodiode array 4, the G transfer part 2, the G photodiode array 5, the B photodiode array 6, and the B transfer part 3 are arranged parallel to each other and perpendicular to a sub-scanning direction 10a. The image sensor has three pairs of a photodiode array and a transfer part adjacent thereto for R, G, and B. Herein, the B photodiode array 6 and the G photodiode array 5 are arranged opposite each other. Output terminals 40a, 40b, and 40c output signals transferred successively by the B transfer part 3, the G transfer part 2, and the R transfer part 1, respectively.

FIG. 15 is an enlarged view of the G transfer part 2. The G transfer part 2 comprises five stages of line memory (ME1 to ME5) 7, a horizontal transfer part 8 provided next to the last stage ME 5 of line memory 7, and an output terminal 40b of the horizontal transfer part 8 connected to an output amplifier 9.

Next, the operation of the prior art linear image sensor will be described with reference to green light (G). Signal charges which are generated in response to incident green light at each photodiode G of the G photodiode array 5 ar transferred into the G transfer part 2. Thereafter, these charges are transferred into the horizontal transfer part 8 through the line memory 7 which constitutes the G transfer part 2, and they are read out in series to the output amplifier 9.

In this prior art device, since the image sensor moves in the sub-scanning direction 10a to read the copy, the differences in reading positions between B and G and between B and R (clearances $L_1$ and $L_2$ in FIG. 14) should be compensated with time. For this reason, line memories 7 having a number of stages corresponding to the clearances $L_1$ and $L_2$ are provided in the G transfer part 2 and the R transfer part 1, respectively, whereby signal outputs obtained by the reading the same portion of the copy by the respective R, G, and B sensors can be output from the output amplifier 9.

In the above-described prior art image sensor, memories are required to compensate for the clearances between the respective photodiode arrays and in a case where the line memories 7 are built in the chip as described above, spaces accommodating the desired number of stages of line memories 7 are needed. Therefore, the chip width is increased and the number of chips that can be manufactured on a wafer is limited, thereby raising production cost. In addition an lengthy clock signal is required for operating the line memory 7.

SUMMARY OF THE INVENTION

It is an object of the present invention to provide an image sensor that requires no memory or only a small memory, compensating for the clearances between the respective photodiode arrays, thereby producing a small sized chip.

Other objects and advantages of the present invention will become apparent from the detailed description give hereinafter; it should be understood, however, that the detailed description and specific embodiment are given by way of illustration only, since various changes and modifications within the spirit and the scope of the invention will become apparent to those skilled in the art from this detailed description.

According to a first aspect of the present invention, an image sensor comprises a plurality of photodiode arrays, each array comprising photodiodes aligned along a main scanning direction, arranged parallel to each other and perpendicular to a sub-scanning direction, and at least one charge transfer means arranged parallel to the photodiode arrays at opposite sides of the plurality of photodiode arrays. One of the adjacent two photodiode array has a potential level different from that of the other photodiode array. Therefore, the clearances between the respective photodiode arrays are reduced and signal charges in the shallower potential well can be completely read out at a high speed.

According to a second aspect of the present invention, an image sensor comprises one unit of photodiodes wherein each photodiode array is arranged within one picture element. Therefore, when signal charges generated by the plurality of photodiodes are read out for the sam portion of the copy simultaneously, a signal processing system such as are external memory compensating for the clearances between the respective photodiodes can be dispensed with.

According to a third aspect of the present invention, an image sensor includes three photodiode arrays which respectively detect three different colors of a primary color series or of a complementary color series, the photodiode array receiving the smallest amount of light is arranged between the other two photodiode arrays, and the potential wells of the photodiodes of this array are shallower than the potential wells of the photodiodes of either of the other two photodiode arrays. Therefore, the reading out of the signal charges by the photodiodes which receive the smallest amount of light is carried out completely and the capacitance of the photodiode receiving a large amount of receiving light and having a saturated output can be increased. In addition, the three photodiode arrays are arranged closely, thereby reducing the clearances between the respective arrays.

According to a fourth aspect of the present invention, an image sensor includes a charge transfer means comprising two horizontal transfer parts transferring in series and outputting charges generated by two photodiode arrays. Charges generated by the photodiode array having a deep potential level and charges generated by the photodiode array having shallow potential wells are separately transferred to the two horizontal transfer parts, whereby those charges generated by the two photodiode arrays adjacent to each other are separately output at the same time.

According to a fifth aspect of the present invention, an image sensor comprises first to third photodiode arrays, each array comprising a plurality of photodiodes aligned parallel to a main scanning direction and perpendicular to a sub-scanning direction and these three arrays detect three different colors of a primary color series or of a complementary color series, respectively. The second photodiode array receiving the smallest amount of light is arranged adjacent to the first photodiode array and is arranged adjacent to the third photodiode array via the transfer gate. The potential wells of the second photodiode array are shallower than those of the third photodiode array. A first transfer means transferring in series and outputting charges generated by the second and the third photodiode arrays is arranged adjacent to and in parallel to the third photodiode array and a second transfer means transferring charges generated from the first photodiode array in series is arranged adjacent to and parallel to the first photodiode array. Therefore, the clearances between the photodiode arrays adjacent to each other are reduced and the area occupied by the first to the third photodiode arrays on the chip is reduced. In addition, signal charges stored in the second photodiode array are completely read out by the first transfer means without leaving charges, and signal charges stored in the first to the third photodiode array ca be simultaneously read out at the same time by the first and the second transfer means through horizontal transfer operations.

BRIEF DESCRIPTION OF THE DRAWINGS

FIG. 8 is a diagram showing time charts of clock pulses for driving an image sensor in accordance with the first embodiment of the present invention;

DETAILED DESCRIPTION OF THE PREFERRED EMBODIMENTS

An embodiment of the present invention will be described in detail with reference to the drawings.

Figure 1:
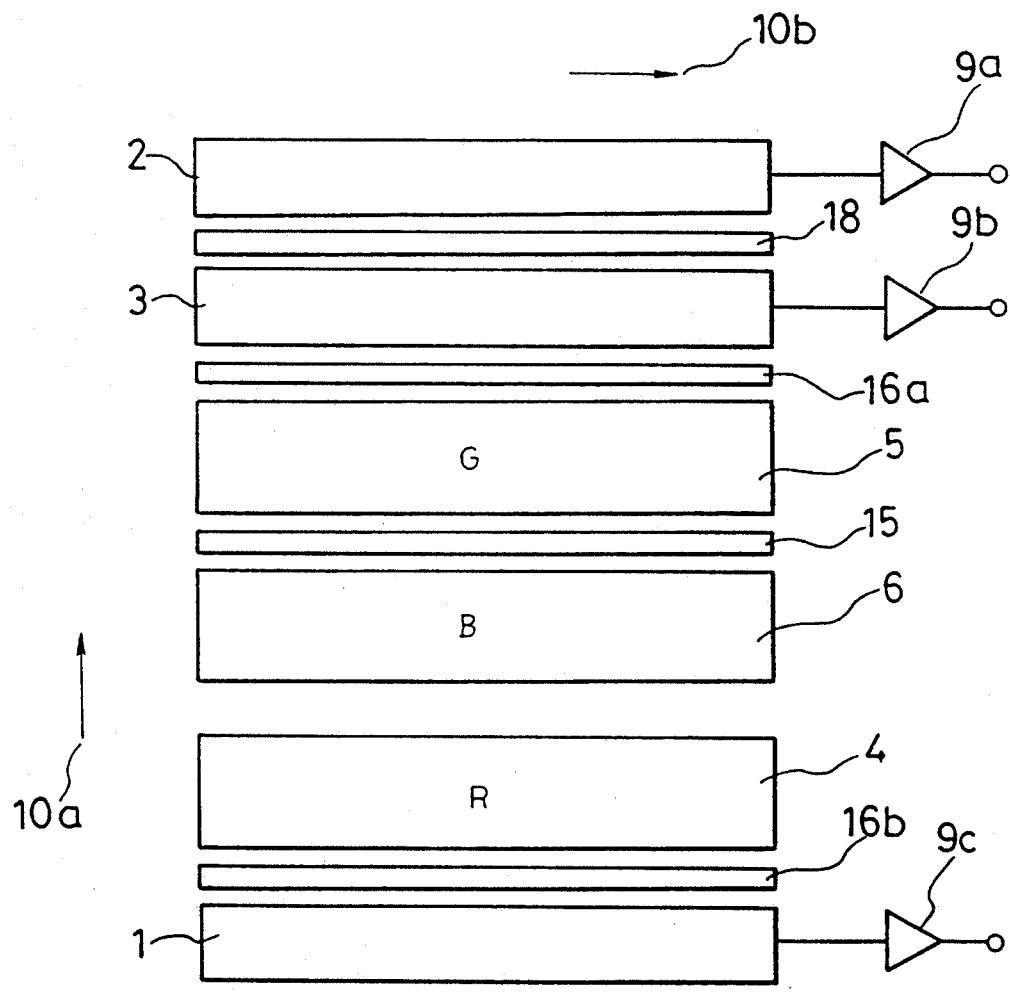
FIG. 1 is a plan view illustrating the construction of an image sensor in accordance with a first embodiment of the present invention.

FIG. 1 is a diagram illustrating a construction of an image sensor in accordance with a first embodiment of the present invention. In FIG. 1, a photodiode array for red signal light (hereinafter referred to as R photodiode array) 4 comprises a plurality of photodiodes for detecting red signal light which are arranged along a main scanning direction 10b. A photodiode array for green signal light (hereinafter referred to as G photodiode array) 5 comprises a plurality of photodiodes for detecting green signal light which are arranged along the main scanning direction 10b. A photodiode array for blue signal light (hereinafter referred to as B photodiode array) 6 comprises a plurality of photodiodes for detecting blue signal light which are arranged along the main scanning direction 10b. These photodiode arrays are arranged perpendicular to a sub-scanning direction 10a and parallel to each other. A transfer part for red signal (hereinafter referred to as R transfer part) 1 is disposed adjacent to the R photodiode array 4 with an intervening transfer gate 16b for successively transfers signal charges detected by the R photodiode array 4 in the main scanning direction 10b. This R transfer part 1 may be a CCD. A transfer part for blue signal (hereinafter referred to as B transfer part ) 3 is disposed adjacent to the G photodiode array 5. A for transfer ring gate 16a transfers signal charges detected by the B photodiode array 6 is disposed between the G photodiode array 5 and the B transfer part 3. A transfer part for green signal (hereinafter referred to as G transfer part) 2 is disposed adjacent to the B transfer part 3 with an intervening parallel transfer gate 18 for transferring signal charges detected by the G photodiode array 5. Output amplifiers 9a, 9b, and 9c amplify signals which are successively transferred and output by the G transfer part 2, the B transfer part 3, and the R transfer part 1, respectively. Thus, the image sensor is constructed such that R, G, and B signal charges are transferred from the R, G, and B photodiode arrays 4, 5, and 6 to the respective output amplifiers 9c, 9a, and 9b via the respective transfer parts 1, 2, and 3.

In this embodiment, it is assumed that the quantity of blue signal charges generated by the B photodiode array 6 is the smallest of the quantities of charges produced in response to the three color signals and that this B photodiode array 6 is arranged between the G and R photodiode arrays 5 and 4.

Figure 10:
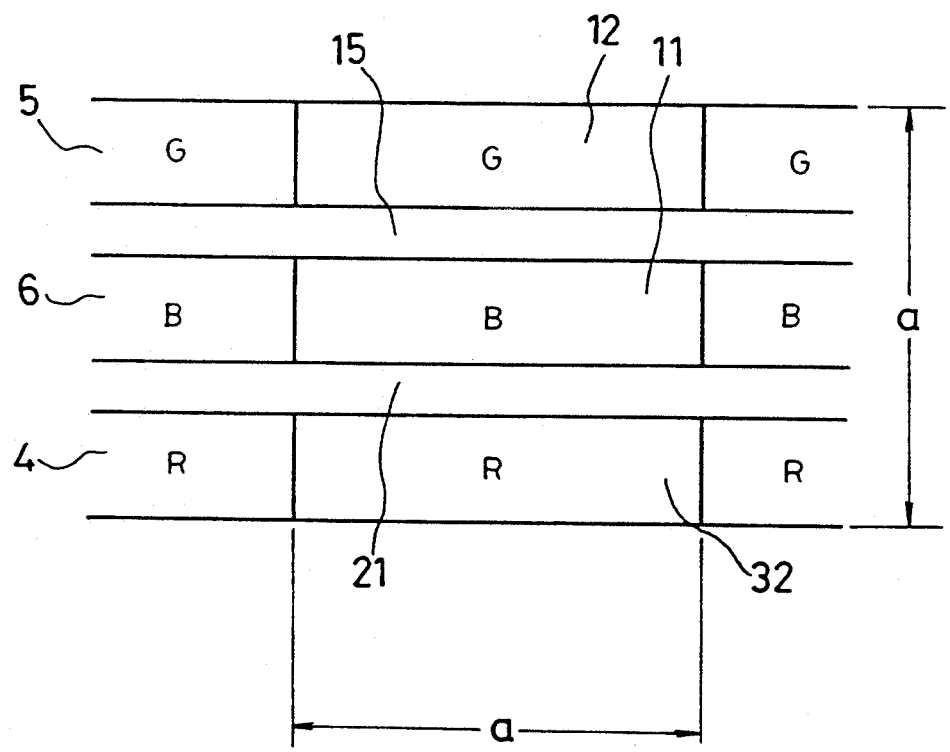
FIG. 10 is a diagram showing a picture element of the image sensor is within a square having a side length a in accordance with the first embodiment of the present invention.

FIG. 10 is a diagram showing a region corresponding to a picture element of the image sensor of this embodiment. In FIG. 10, a G photodiode 12 of the G photodiode array 5, a B photodiode 11 of the B photodiode array 6, and a R photodiode 32 of the R photodiode array 4 are arranged adjacent to one another in a region corresponding to one picture element whose area is represented by a x a.

In the image sensor having the structure of this embodiment, it is possible to produce signal outputs at the same time which are the same as signal outputs produced when the same portion of the copy is read out by the R, G, and B photodiodes without providing a signal processing system compensating for the clearances between those photodiodes, such as a line memory. Accordingly, the chip size can be substantially reduced and the number of chips produced on a wafer can be increased, thereby lowering production cost.

A description is given of the signal reading operation of the image sensor in accordance with this embodiment. Hereinafter reference characters R, G, and B represent 'red signal', 'green signal', and 'blue signal', respectively.

First of all, a description is given of the operation at the G and B side. As shown in FIG. 1, the B photodiode array 6, the G photodiode array 5, the B transfer part 3, and the G transfer part 2 are close to each other. The transfer gate 15 is disposed between the B and G photodiode arrays 5 and 6, the transfer gate 16a is disposed between the G photodiode array 5 and B transfer part 3, and the transfer gate 18 is disposed between the B and G transfer parts 3 and 2. These transfer gates 15, 16a, and 18 serve as barriers. The output terminals of the G and B transfer parts 2 and 3 are electrically connected to the output amplifiers 9a and 9b, respectively.

Figure 2:
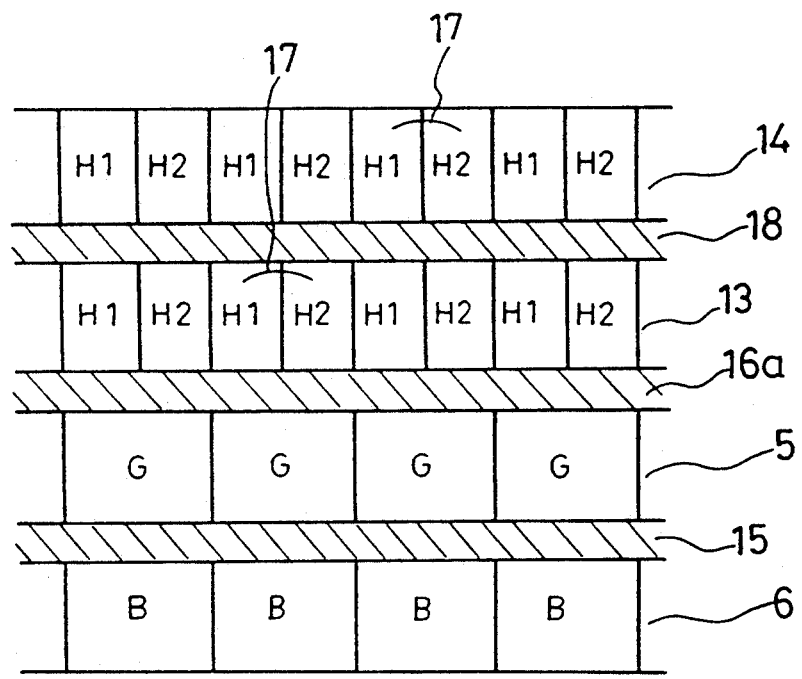
FIG. 2 is an enlarged view illustrating a portion of the image sensor of FIG. 1.

FIG. 2 is an enlarged view of a part of FIG. 1. In FIG. 2, the same reference numerals as those in FIG. 1 designate the same parts. Reference numeral 13 designates a B CCD channel and reference numeral 14 designates a G CCD channel. A gate pairs 17 including an $H_1$ and $H_2$ gate of the horizontal transfer CCD are produced on the B and G CCD channels 13 and 14.

Figure 3:
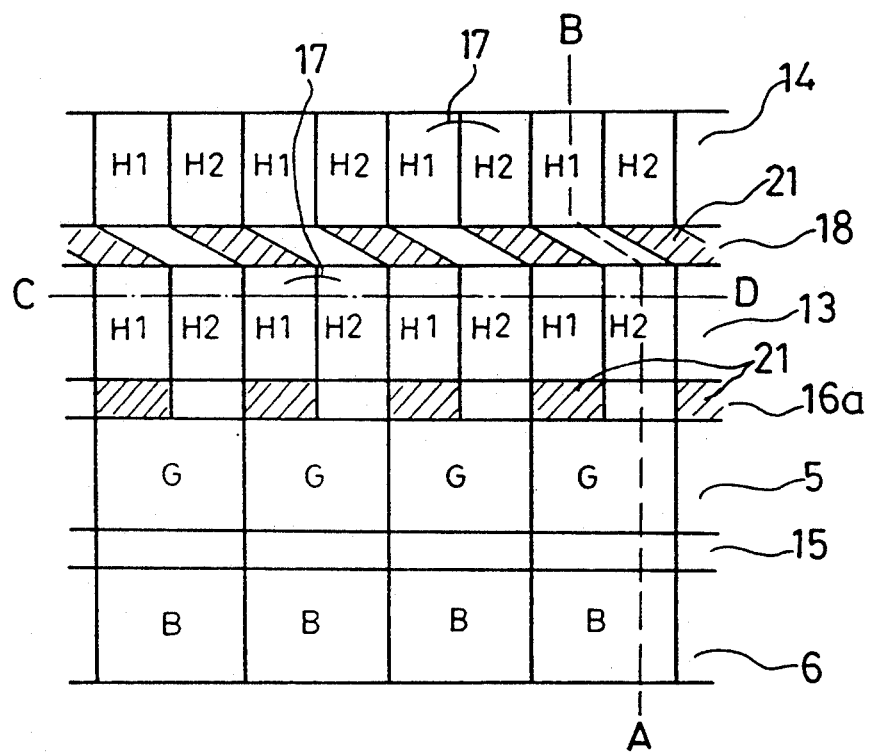
FIG. 3 is a diagram schematically illustrating the transfer path for signal charges of an image sensor in accordance with the first embodiment of the present invention.

FIG. 3 is a diagram for explaining the transfer path of B signal charges and G signal charges from the B photodiode array 6 and the G photodiode array 5 in FIG. 2. Reference numeral 21 designates separation bands in the parallel transfer gate 18 and the transfer gate 16a.

FIGS. 4(a) to 6(b) are diagrams schematically illustrating the potential along a cross-section taken along a line A-B of FIG. 3 and FIGS. 7(a)-7(c) are diagram schematically illustrating the potential along a cross section taken along a line C-D of FIG. 3. In FIGS. 4(a) to 6(b), reference numeral 11 designates a B photodiode the B photodiode array 6 and reference numeral 12 designates a G photodiode of the G photodiode array 5. The potential well of the B photodiode 11 is shallower than that of the G photodiode 12. An $H_2$ gate 17a of the horizontal transfer CCD is produced on the B CCD channel 13 and an $H_1$ gate 17b of the horizontal transfer CCD is produced on the G CCD channel 14. The image sensor of this embodiment is produced on the substrate 20 whose potential level is represented by numeral 22. A signal charge 19a is detected at the B photodiode 11 and a signal charge 19b is detected at the G photodiode 12.

A description is given of the potential changes and the transition of G and B signal charges at times $t_0$ to $t_5$ in accordance with the time chart of FIG. 8.

Figure 4A:
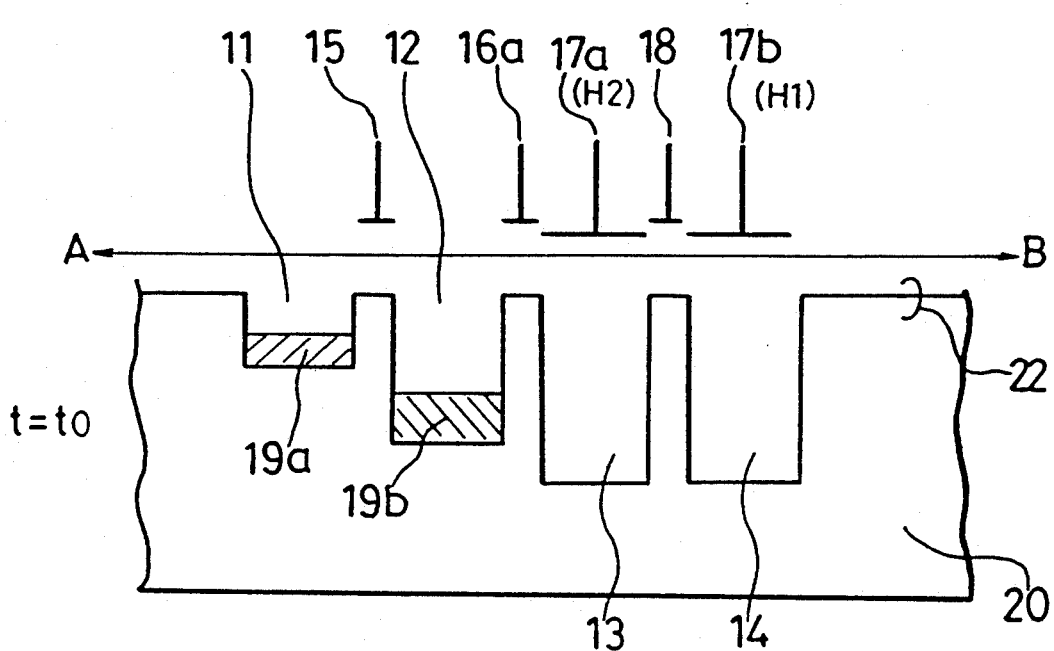
FIGS. 4(a) and 4(b) are sectional views taken along a line A-B of FIG. 3, schematically illustrating the potential levels in the substrate at time $t_0$ and $t_1$, respectively.
Figure 4B:
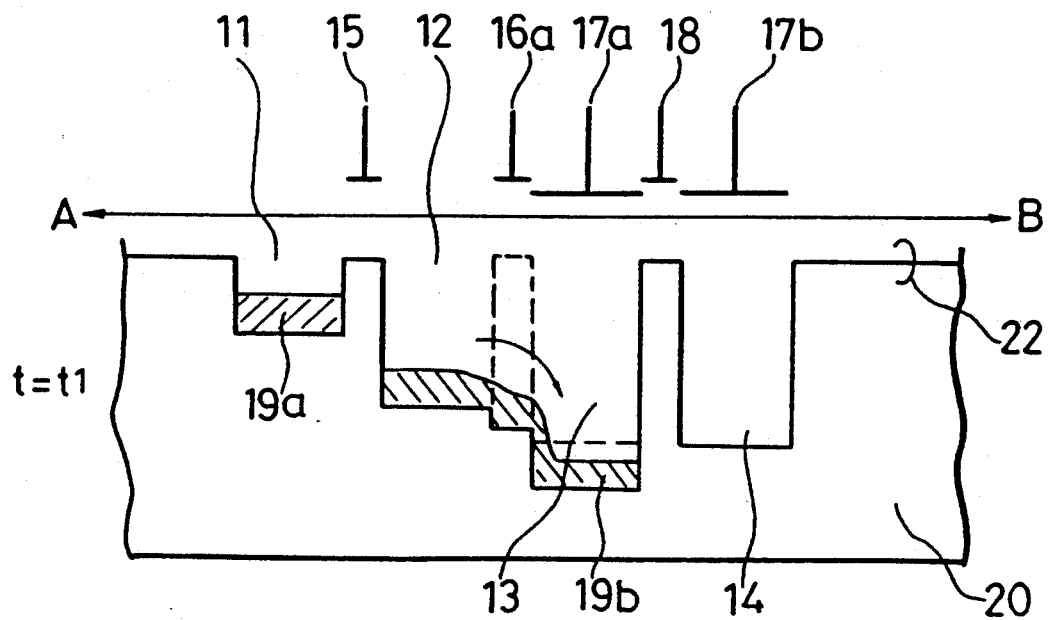

At time $t_0$, the potentials of the barrier transfer gate (BTG) 15, the transfer gate (TG) 16a, the parallel transfer gate (PTG) 18, the $H_2$ gate 17a on the B CCD channel 13, and the $H_1$ gate 17b on the G CCD channel 14 are at low level and the signal charges 19a and 19b are stored in the B photodiode 11 and the G photodiode 12, respectively (FIG. 4(a)).

At time $t_1$, the potential of the transfer gate 16a is at high level and the G signal charges 19b are transferred and drained into the B CCD channel 13. At this time, since the potential of the $H_2$ gate 17a of the horizontal transfer CCD in the B CCD channel 13 is at high level, charges are easily stored there (FIG. 4(b)).

Figure 5A:
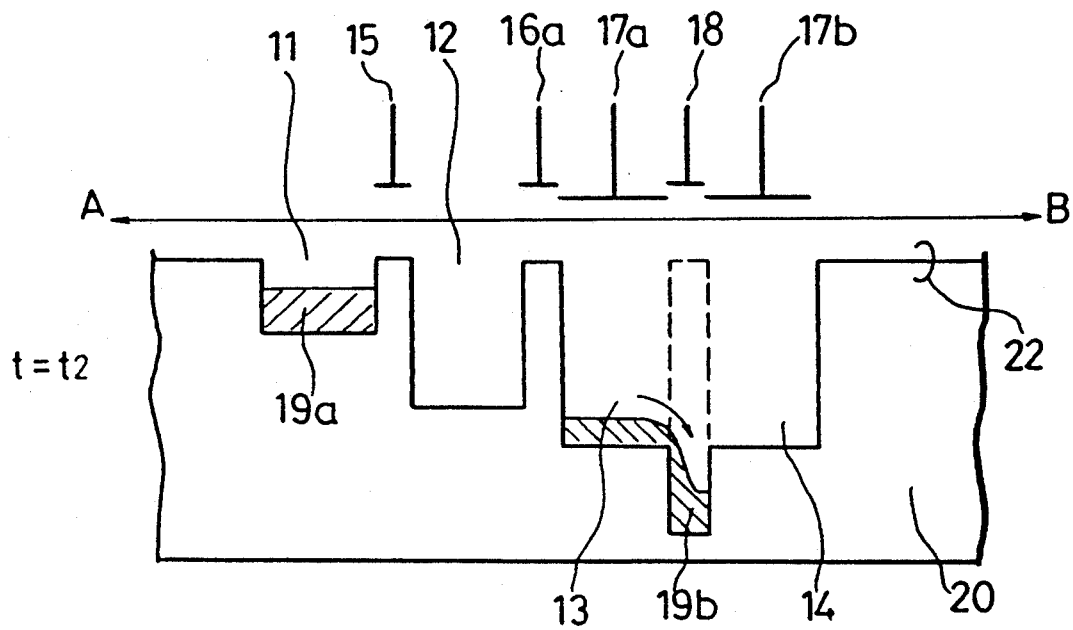
FIGS. 5(a) and 5(b) are sectional views taken along a line A-B of FIG. 3, schematically illustrating the potential levels in the substrate at time $t_2$ and $t_3$, respectively.

At time $t_2$, the potential of the parallel transfer gate 18 is at high level and the G signal charges are stored in the potential well below the parallel transfer gate 18 (FIG. 5(a)).

Figure 5B:
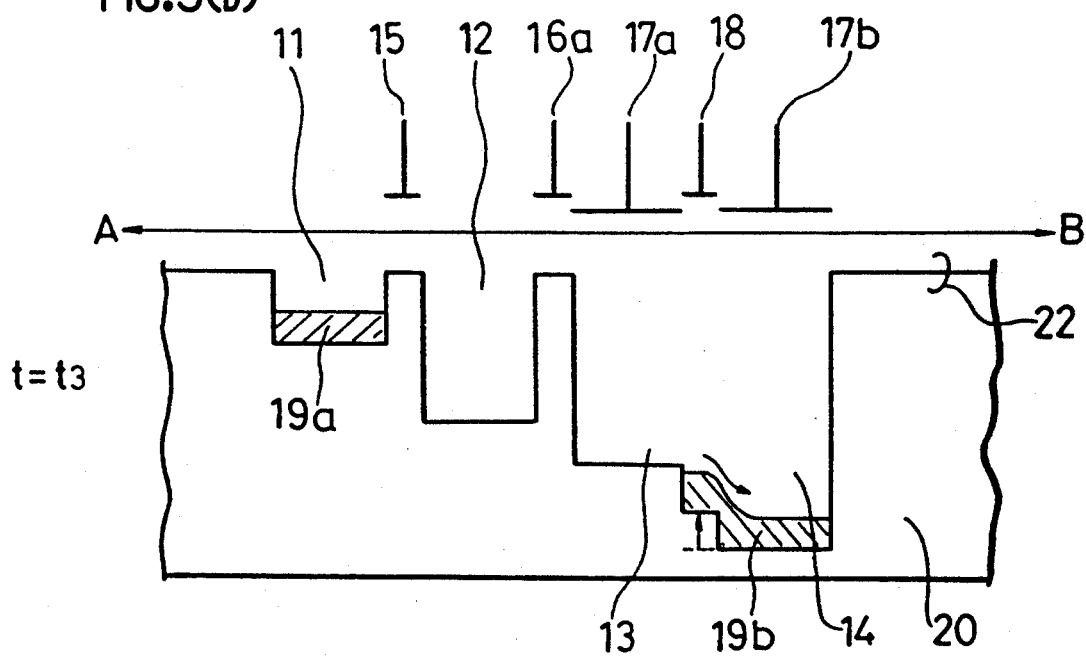

At time $t_3$, the potential of the parallel transfer gate 18 is at low level while that of the $H_1$ gate 17b of the horizontal transfer CCD in the G CCD channel 14 is at high level, whereby the G signal charges are transferred and drained into the G CCD channel 14 (FIG. 5(b)).

Figure 6A:
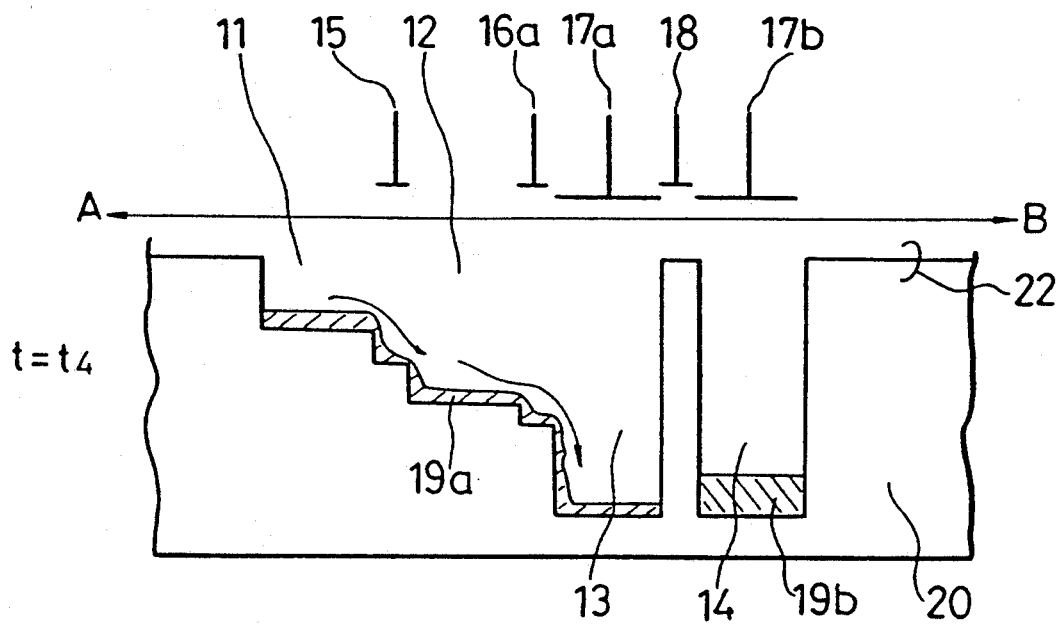
FIGS. 6(a) and 6(b) are sectional views taken along a line A-B of FIG. 3, schematically illustrating the potential levels in the substrate at time $t_4$ and $t_5$, respectively.

At time $t_4$, the potential of the parallel transfer gate 18 is at low level while that of the barrier gate 15 and that of the transfer gate 16a are at high level, whereby the B signal charges 19a are transferred and stored in the B CCD channel 13 (FIG. 6(a)). At this time, since the potential of the $H_2$ gate 17a is at high level, charges are easily stored in the B CCD channel (FIG. 7(a)).

Figure 6B:
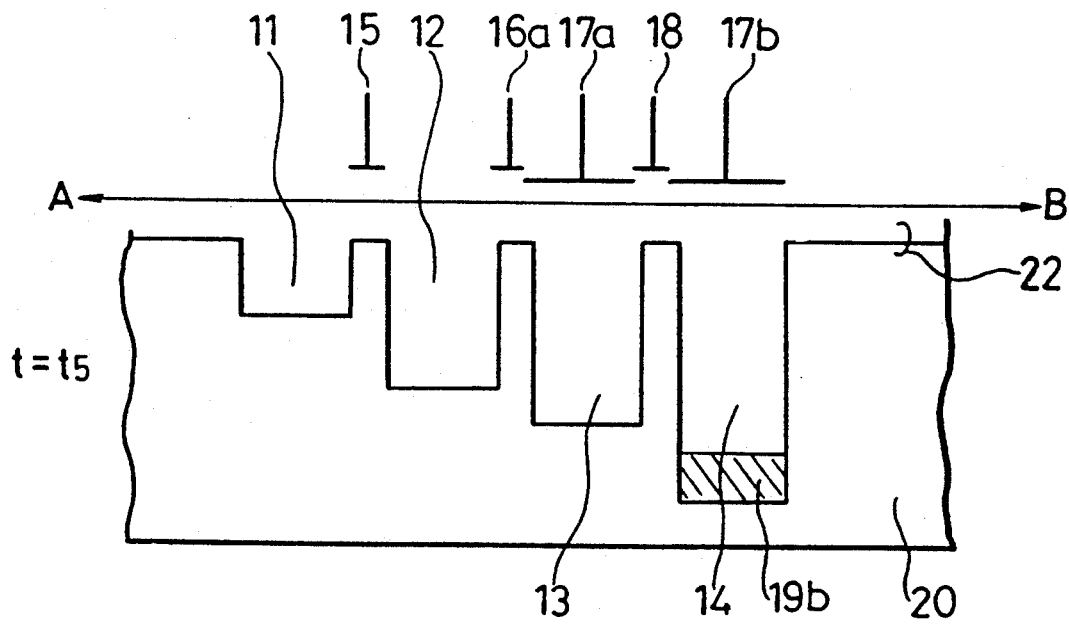

At time $t_5$, the potential of the $H_1$ gate 17b in the G CCD channel 14 is at high level while that of the $H_2$ gate 17a in the B CCD channel 13 is at low level, whereby the B signal charges 19a stored in the potential well below the $H_2$ gate 17a are transferred into the potential well below the $H_1$ gate 17b in the B CCD channel 13 (FIGS. 6(b) and 7(b)). In this state, the B signal charges 19a and the G signal charges 19b are stored in the potential well below the $H_1$ gate of horizontal CCD in the B horizontal transfer CCD channel 13 and in the potential well below the $H_1$ gate of horizontal CCD in the G horizontal transfer CCD channel 14, respectively.

Figure 7A:
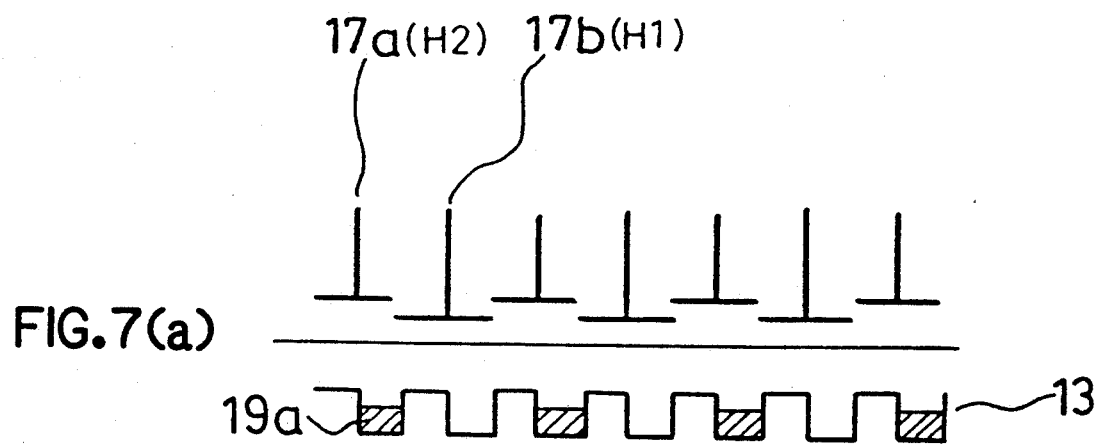
FIGS. 7(a) to 7(c) are sectional views taken along a line C-D of FIG. 3, schematically illustrating the potential levels below electrodes $H_1$ and $H_2$, respectively.
Figure 7B:
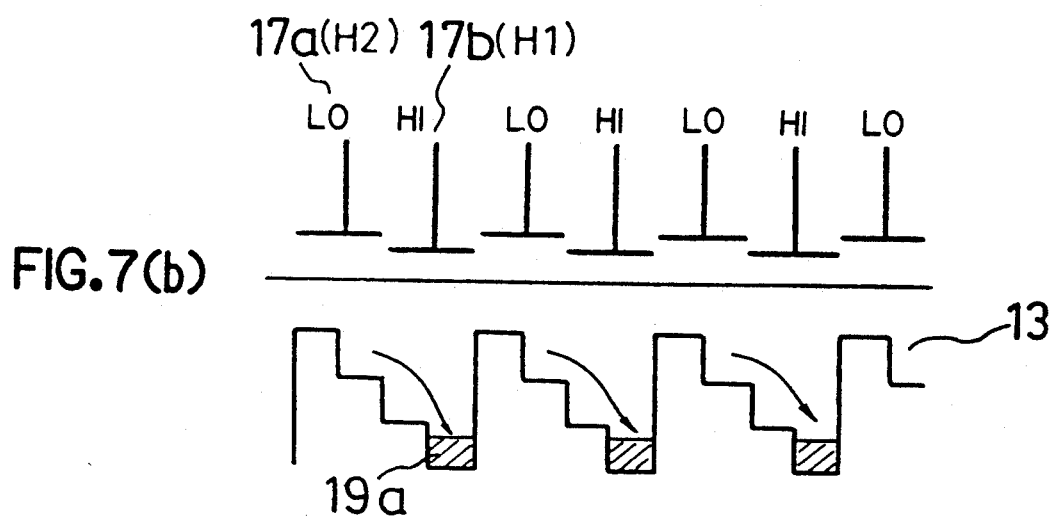
Figure 7C:
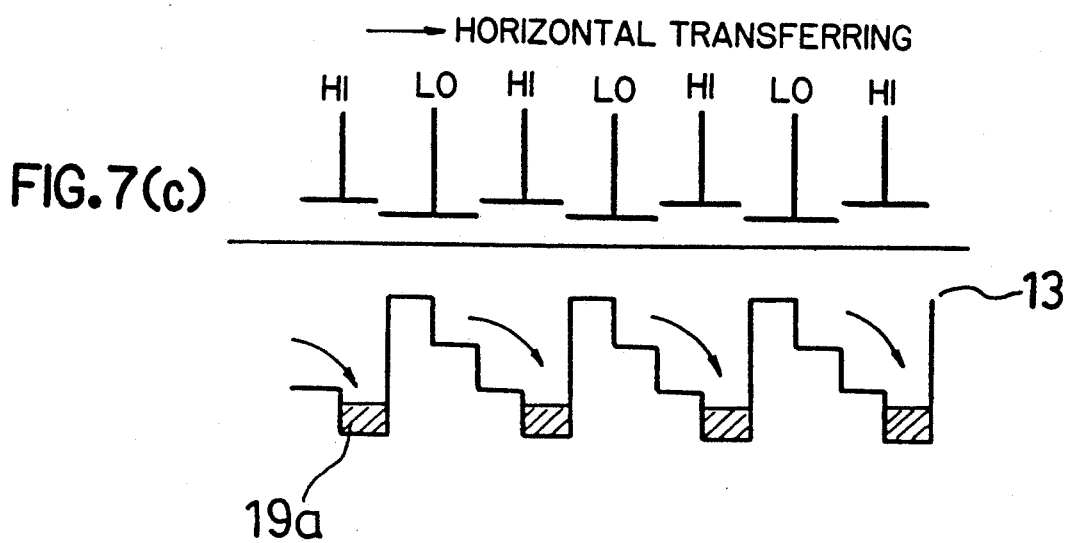

Thereafter, the potential levels of the $H_1$ gate and the $H_2$ gate of horizontal CCD are alternated between high and low and the B signal charges 19a are successively transferred (FIGS. 7(b) and 7(c)). At the same time the G signal charges 19b are successively transferred. Thus, both signal charges are horizontally transferred independently to the output amplifiers 9a and 9b with the same timing.

In the method for transferring G and B signal charges in accordance with this embodiment, the B photodiode 11 is arranged adjacent to the G photodiode 12 with the transfer gate 15 intervening and the potential wells of the G photodiode 12 are deeper than those of the B photodiode 11, whereby the signal charges 19a of the B photodiode 11 are drained into the B CCD disposed adjacent to the G photodiode 12. Therefore, the signal charges of the B photodiode can be completely read out.

In addition, since the potential wells of the G photodiode 12 are sufficiently deep, a capacitance of G photodiode 12 corresponding to a saturation current output can be obtained.

A description is given of the transition of all signal charges including the transition of R signal charges at the time of operating the image sensor with the clock timing shown in FIG. 8, with reference to FIG. 9(a)-9(f).

Figure 9A:
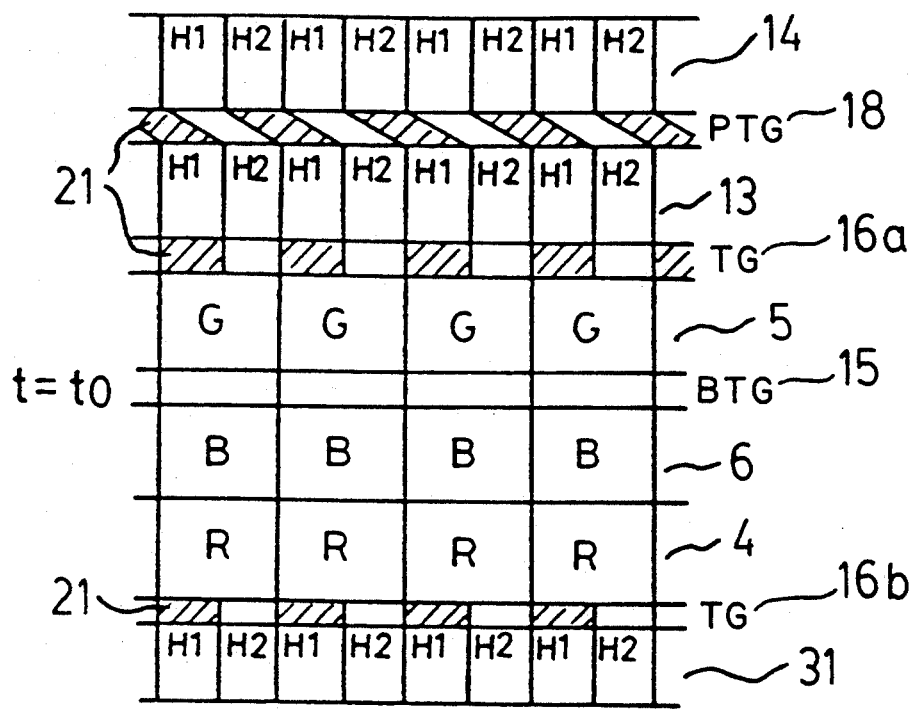
FIGS. 9(a) to 9(f) are diagrams schematically showing the movement of charges in an image sensor in response to the clock pulses of FIG. 8.
Figure 9B:
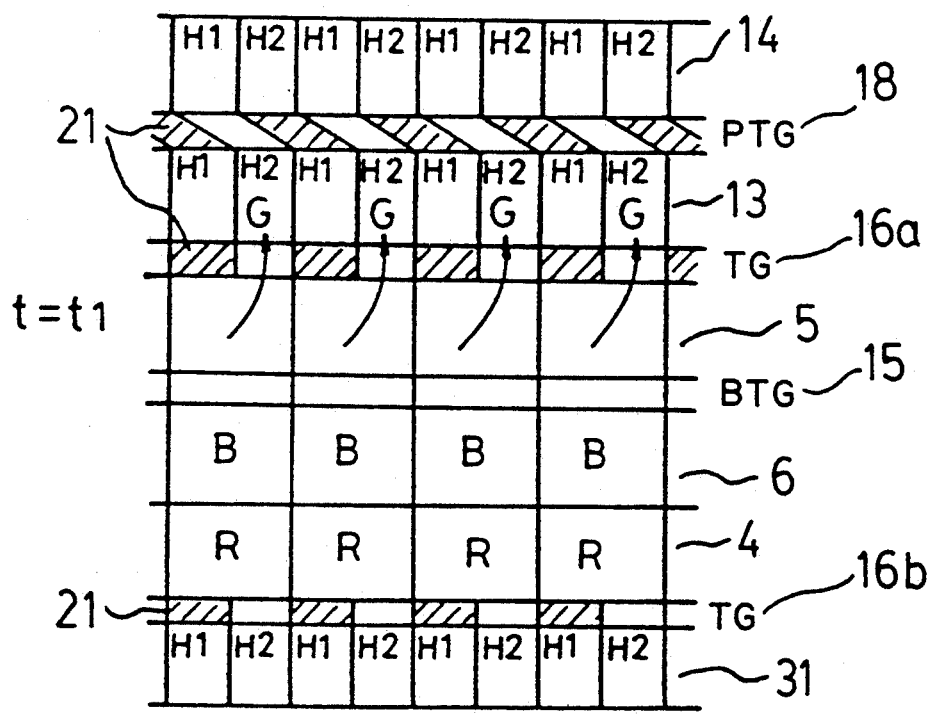
Figure 9C:
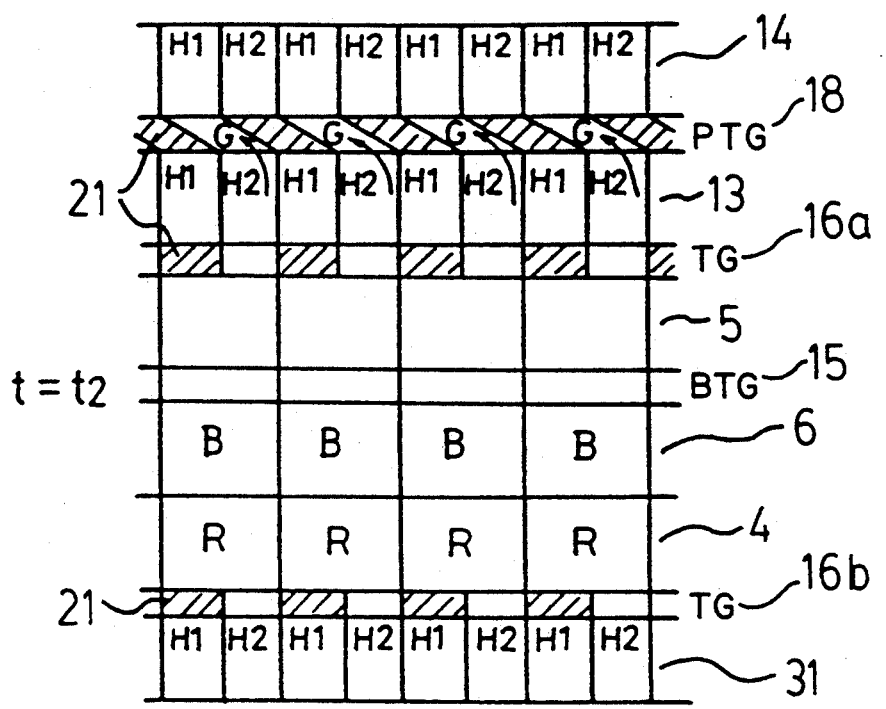
Figure 9D:
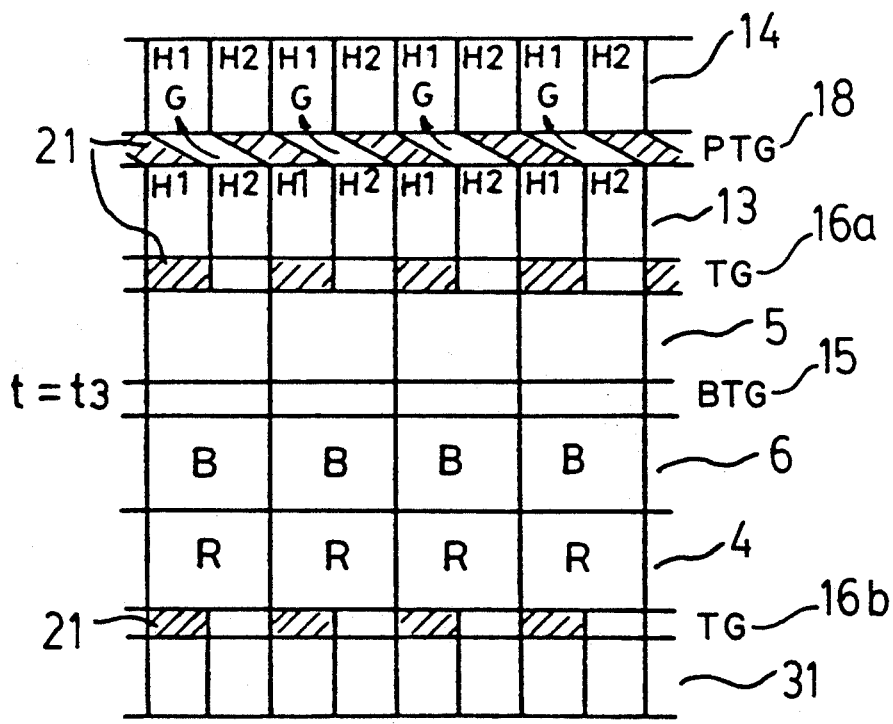
Figure 9E:
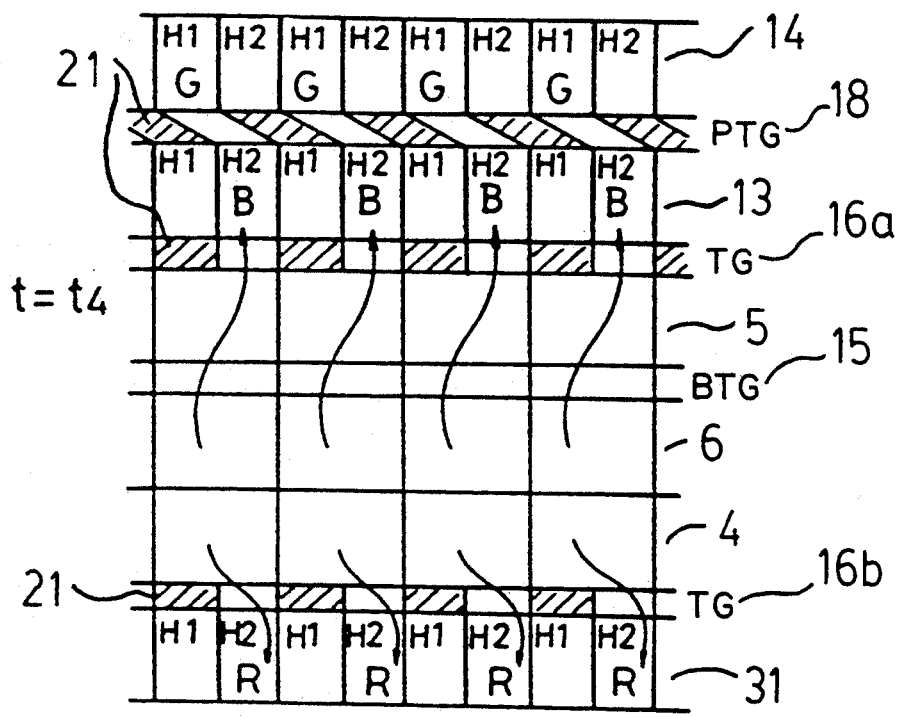
Figure 9F:
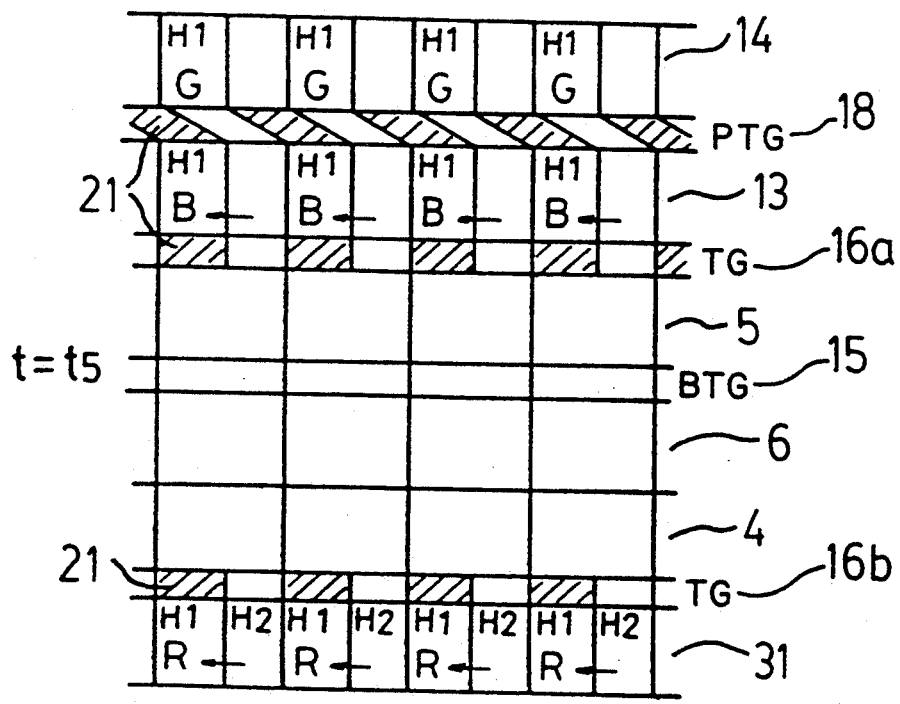

Since the transition of the G and B signal charges shown in FIGS. 9(a) to 9(f) is the same as that shown in FIGS. 4(a) to 6(b) a, description thereof will be omitted. The following description is mainly directed to the transition of R signal charges. The R signal charges are stored in the R photodiode 4 at time $t_0$ similarly as the G and B signal charges and they are held in the R photodiode 4 until time $t_4$ as shown in FIGS. 9(a) to 9(d). When the potential of the transfer gate 16b becomes high level at time $t_4$, the R signal charges are transferred to the potential well below the $H_2$ gate of horizontal transfer CCD in the R CCD channel as shown in FIG. 9(e). At time $t_5$, the potential of $H_1$ gate 17b becomes high level and the potential of the $H_2$ gate 17a becomes low level, whereby the R signal charges are transferred to the potential well below the $H_2$ gate of horizontal CCD, as shown in FIG. 9(f).

Accordingly, at time $t_5$, the R signal charges detected by the R photodiode 4 are stored in the potential well below the $H_1$ gate in the R CCD channel 31, the B signal charges detected by the B photodiode 6 are stored in the potential well below the $H_1$ gate in the B CCD channel 13, and the G signal charges detected by the G photodiode 5 are stored in the potential well below the $H_1$ gate in the G CCD channel 14. Thereafter, these three kinds of signal charges are horizontally transferred, independently, in parallel with one another while the potential level of the $H_1$ gate and that of the $H_2$ gate are alternated between high and low, thereby outputting R, G, and B signals to the output amplifiers 9a, 9b, and 9c, respectively, at the same time.

In the above-described image sensor, the R photodiode array 4, the G photodiode array 5, and the B photodiode array 6 are arranged close to each other within one picture element, the R transfer part 1, the G transfer part 2, and the B transfer part 3 are provided at the outside thereof, the potential wells of the B photodiode are shallower than that of the G photodiode, and the R, G, and B signal charges are output by the R, G, and B transfer parts at the same time. Therefore, the signal charges generated when the R, G, and B photodiodes read the same portion of a copy can be output at the same time without requiring a signal processing system such as an external memory. As a result, a device including the image sensor can be produced cheaply. Furthermore, the width of the chip on which the image sensor is mounted can be reduced, so that a large number of image sensors can be obtained from a wafer. Thus, the cost of the image sensor itself can be significantly reduced.

While in the above-illustrated embodiment the R, G, and B photodiodes are produced within one picture element, in a case where the area of one picture element is reduced so as to increase resolution without lowering the light-to-electricity conversion, the R, G, and B photodiodes sometimes cannot be produced within one picture element. In such a case, the difference between the reading positions for R, G, and B needs to be compensated for by time similarly as in the prior art. For example, in the image sensor described above, memories having a number of stages corresponding to the distances between the R and B photodiode arrays and between the R and G photodiode arrays are required in the front stage of the B transfer part 3 and of the G transfer part 2, respectively. However, in the above-illustrated construction, since the R, G, B photodiode arrays 4, 5, and 6 are closely spaced to each other, the spaces between the respective arrays are quite small, so that only a few stages of memories are required for adjusting the clearances, thereby reducing the chip size compared with the prior art. As a result, the number of chips produced in a wafer can be increased, whereby the production cost can be reduced.

While in the above-illustrated embodiment the G and B signal charges are transferred parallel to each other using the G and B transfer parts comprising horizontal transfer CCDs, these signal charges may be read alternatingly using only one horizontal transfer CCD. Such construction is described hereinafter.

Figure 11:
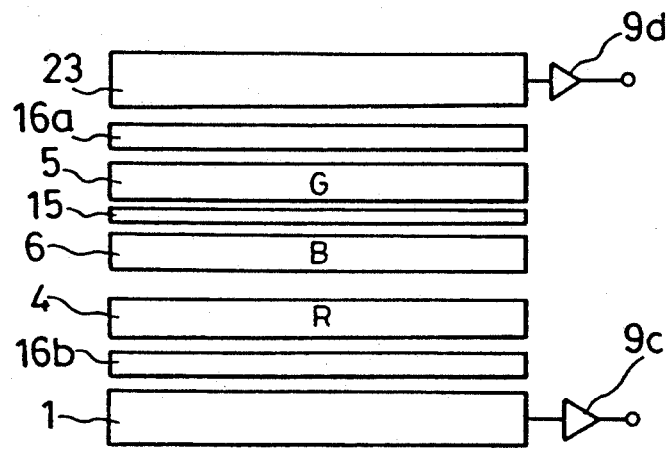
FIG. 11 is a plan view illustrating the construction of an image sensor in accordance with a second embodiment of the present invention.

FIG. 11 is a diagram illustrating the construction of the image sensor according to a second embodiment of the present invention. In FIG. 11, the same reference numerals as those in FIG. 1 designate the same parts. Reference numeral 23 designates a GB transfer part. The B photodiode array 6 in which the least amount of charges are generated is arranged between the G and R photodiode arrays and the potential wells of the B photodiode are shallower than that of the G photodiode.

Figure 12A:
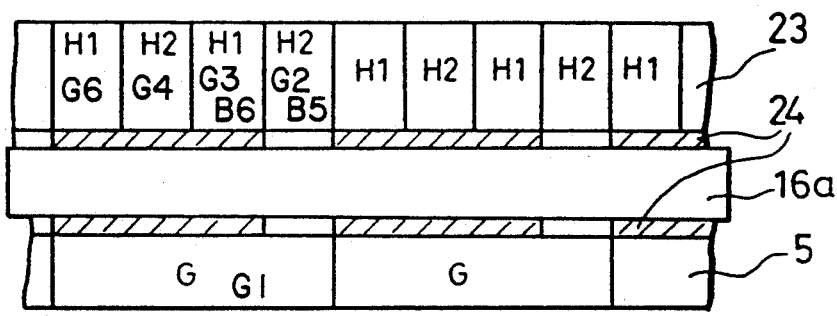
FIG. 12(a) is an enlarged view showing a part of the image sensor of FIG. 11.
Figure 12B:
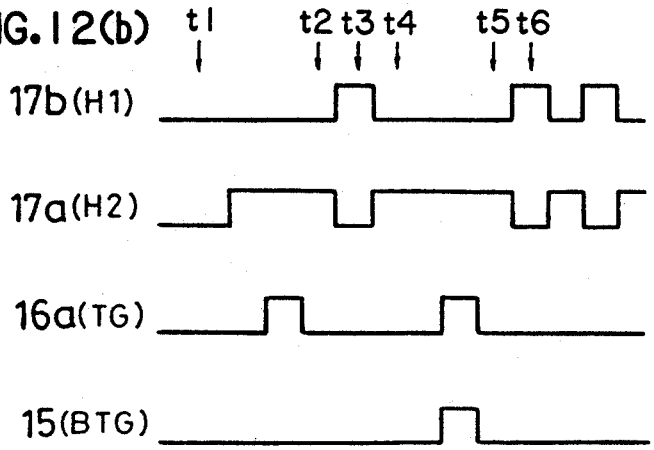
FIG. 12(b) is a diagram showing time charts of clock pulses driving the image sensor of FIG. 11.
Figure 12C:
FIG. 12(c) is a diagram illustrating output signals of the image sensor of FIG. 11.

First of all, a description is given of a case where the G signal charges and the B signal charges are read out alternatingly like G, B, G, B . . . by the GB transfer part 23. FIG. 12(a) is an enlarged view of the GB transfer part 23 of FIG. 11 during the reading operation, FIG. 12(b) is a time chart showing clock pulses applied for operating the sensor, and FIG. 12(c) shows an output signal from the GB transfer part 23. In these figures, reference numeral 24 designates a separation band, reference character $G_t$ designates the position of G signal charges at time t, and the reference character $B_t$ designates the position of B signal charges at time t. As shown in these figures, at time $t_1$, the potentials of the $H_1$ gate 17b and the $H_2$ gate 17a which are horizontal transfer gates of the CCD channel constituting the GB transfer part 23 and the potentials of the transfer gate 16a and the barrier transfer gate 15 are all at low level, and the G and B signal charges are stored in the respective photodiodes.

At time $t_2$, the potentials of the transfer gate 16a and the $H_2$ gate 17a are at high level and the G signal charges are transferred into the CCD channel below the $H_2$ gate 17a. At time $t_3$, the potential of the $H_1$ gate 17b is at high level while that of the $H_2$ gate 17a is at low level, and the G signal charges are transferred into the CCD channel below adjacent $H_1$ gate. At time $t_4$, the potential of the $H_1$ gate 17b is at low level while that of the $H_2$ gate 17a is at high level, and the G signal charges are transferred into the CCD channel below adjacent $H_2$ gate. Furthermore, at time $t_5$, the potential levels of the $H_1$ gate and the $H_2$ gate do not change while the potentials of the transfer gate 16a and the parallel transfer gate 15 become high level, whereby the B signal charges stored in the B photodiode are transferred into the CCD channel below the $H_2$ gate of the G/B transfer part 23. Then, at time $t_6$, the potential of the $H_1$ gate is at high level while that of the $H_2$ gate is at low level, and the B and G signal charges are transferred into the CCD channel below adjacent H₁ gate. Thereafter, the potential levels of the H₁ gate and the H₂ gate are alternated between high and low, and the G and B signal charges are transferred successively, thereby obtaining the signal outputs like G, B, G B . . . as shown in FIG. 12(c).

Figure 13A:
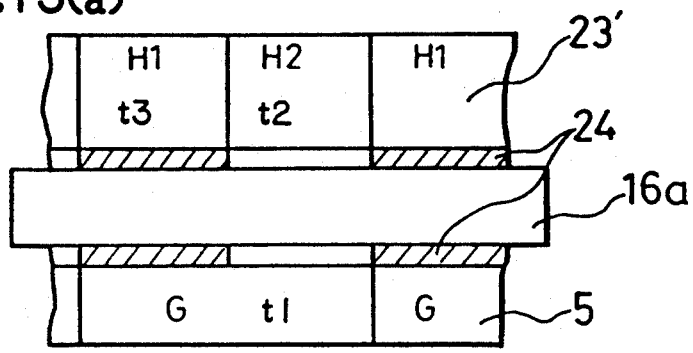
FIG. 13(a) is another enlarged view showing a part of the image sensor of FIG. 11.
Figure 13B:
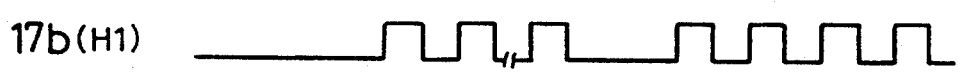
FIG. 13(b) is a diagram showing time charts of clock pulses driving the image sensor of FIG. 11.
Figure 13C:
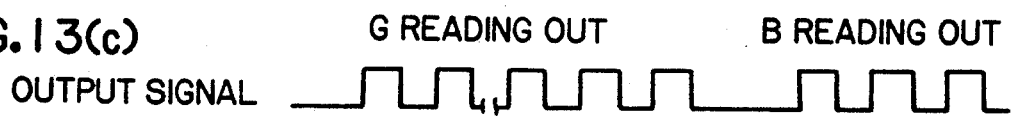
FIG. 13(c) is a diagram illustrating output signals of the image sensor of FIG. 11.
Figure 14:
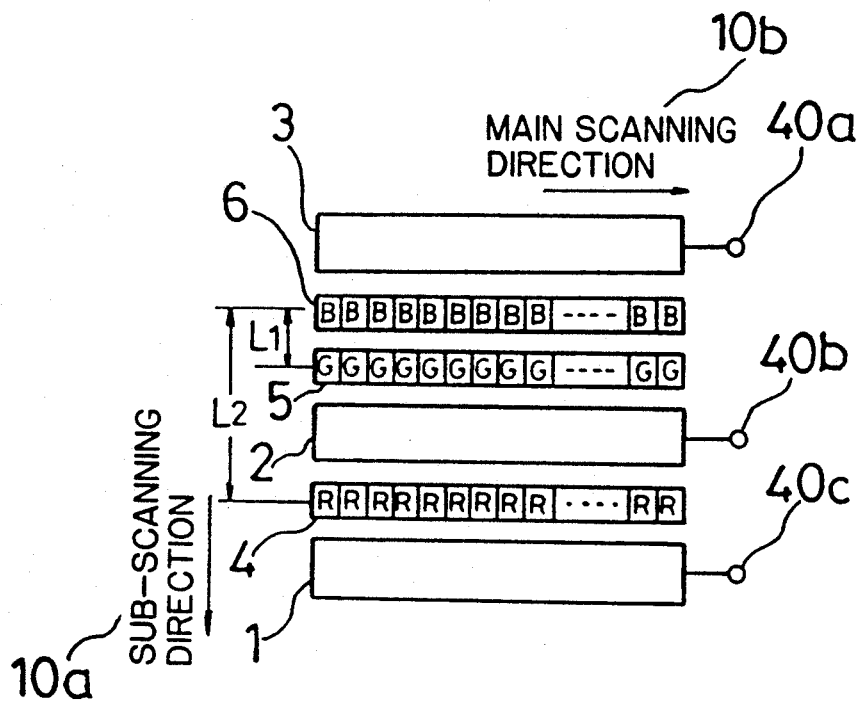
FIG. 14 is a plan view schematically illustrating the construction of a prior art image sensor.
Figure 15:
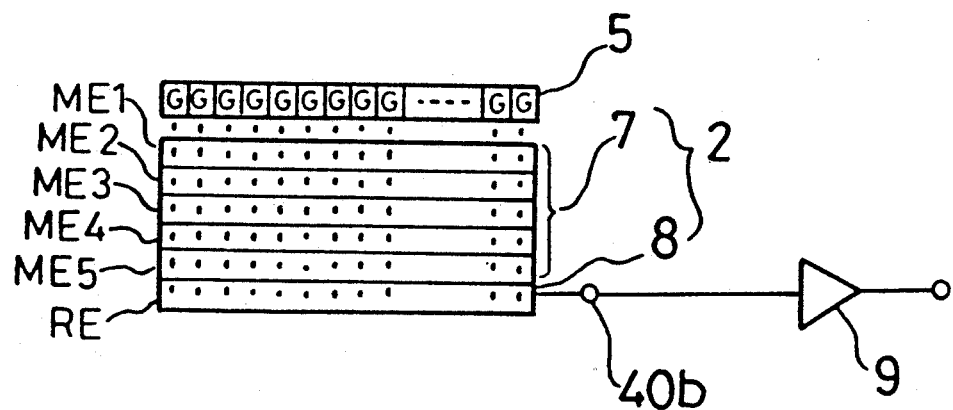
FIG. 15 is an enlarged view illustrating the transfer part of the image sensor of FIG. 14.

FIGS. 13(a)-13 (c) show a case where the G signal charges and the B signal charges are read out like G, G, B, B, G, G, . . . by the GB transfer part 23, in which FIG. 13(a) is an enlarged view of the GB transfer part, FIG. 13(b) is a time chart showing clock pulses applied for operating the sensor, and FIG. 13(c) shows the output signal from the GB transfer part 23.

As shown in these figures, the G signal charges stored in the G photodiode 5 are transferred into the CCD channel below the H₂ gate of the GB transfer part 23' at time t₂ and further transferred into the CCD channel below adjacent H₁ gate at time t₃ and then read out. Meanwhile, the B signal charges stored in the B photodiode 6 are transferred into the GB transfer part 23' at times t₁' and t₂' after the reading out of the G signal charges and then read out successively. As a result, the output signal as shown in FIG. 13(c) is obtained.

The method for reading out the G and B signal charges of this second embodiment is different from that of the first embodiment, but the construction is the same as that of the first embodiment. Therefore, the R, G, and B photodiodes can be arranged close to each other and the memory for signal outputs which are read out from the same portion of a copy at the same time, such as a line memory, can be simplified with the same effect as in the first embodiment.

In the above-illustrated embodiment, the color image sensor detects hues of a primary color series, i.e., red, green and blue is described, but the present invention can be applied to the image sensor detecting hues of complementary color series, i.e., cyan(C), yellow(Y), and green(G). Also in such a case, the same effects as described above can be obtained by arranging the photodiode array which detects the color having the lowest sensitivity in the center row. Furthermore, number of the photodiode arrays is not limited to three. Four photodiode arrays may be provided for detecting four kinds of hues and also in this case the method for transferring signal charges of the present invention can be applied with the same effects as described above.

As is evident from the foregoing description, according to the present invention, a plurality of photodiode arrays are arranged close to each other, the potential wells of one of these photodiode arrays are deeper than the potential wells of another photodiode array adjacent thereto receiving a smaller amount of light, the photodiode having the shallower potential well is connected to the photodiode having a deeper potential via a transfer gate, and the photodiode well having a deeper potential is further connected to the transfer means for the parallel transfer. Therefore, the clearances between the respective photodiode arrays can be reduced and complete reading out of signal charges can be achieved in the photodiode having the small signal output, whereby the capacitance of the photodiode having a large saturation output can be increased. Furthermore, all the photodiodes can be easily produced within one picture element because the clearances between the respective photodiode arrays are reduced, and the output signals read out from the same portion of a copy can be obtained at the same time without requiring an external memory. In addition, even if a memory is needed compensating for clearances between the respective photodiode arrays, only a few stages of memory are required, thereby simplifying the signal processing system such as an external memory.

Caused by the above-described effects, a device including the image sensor of the present invention can be produced at low cost. Furthermore, since the width of the image sensor chip can be reduced, a large number of chips can be produced in a wafer, resulting in a reduction of the production cost of the image sensor itself.

What is claimed is:

1. An image sensor comprising:
   a plurality of photodiode arrays, each array comprising a plurality of photodiodes for generating electrical charges in response to incident light, each photodiode having a potential well for storing electrical charges, said arrays being aligned along a main scanning direction parallel to each other and closely spaced to each other along a sub-scanning direction perpendicular to the main scanning direction; and
   first and second charge transfer elements disposed parallel to said photodiode arrays with said photodiode arrays therebetween for serially transferring electrical charges generated by said arrays from the potential wells and for outputting charges generated by said photodiodes in two adjacent photodiode arrays of said plurality of photodiode arrays, the photodiodes of a first of said two adjacent photodiode arrays having potentials lower in magnitude than the potentials of the photodiodes of the second of said two adjacent photodiode arrays after transfer of electrical charges by said first and second charge transfer elements, the charges generated by the second photodiode array being transferred in parallel independently of the transfer of charges generated by the first photodiode array.

2. The image sensor of claim 1 wherein a plurality of photodiodes including photodiodes selected from each of said plurality of photodiode arrays comprises one picture element.

3. An image sensor comprising:
   three photodiode arrays, each array comprising a plurality of photodiodes for generating electrical charges in response to incident light, each photodiode having a potential well for storing electrical charges, each array for respectively detecting incident light of one of three different colors of a primary color series, said arrays being aligned along a main scanning direction parallel to each other and closely spaced to each other along a sub-scanning direction perpendicular to the main scanning direction, the photodiode array for detecting the smallest quantity of light among the light of the three colors being disposed between the other two photodiode arrays; and
   at least two charge transfer means disposed parallel to said photodiode arrays with said photodiode arrays therebetween for transferring electrical charges generated by said arrays from the potential wells wherein the potential wells of the photodiodes of the photodiode array for detecting the smallest quantity of light have potentials smaller in magnitude than the potentials of the potential wells of the photodiodes of the other two photodiode arrays after transfer of electrical charges by said at least two charge transfer means.

4. An image sensor comprising:

three photodiode arrays, each array comprising a plurality of photodiodes for generating electrical charges in response to incident light, each photodiode having a potential well for storing electrical charges, each array for respectively detecting incident light of one of three different colors of a complementary color series, said arrays being aligned along a main scanning direction parallel to each other and closely spaced to each other along a sub-scanning direction perpendicular to the main scanning direction, the photodiode array for detecting the smallest quantity of light among the light of the three colors being disposed between the other two photodiode arrays; and at least two charge transfer means disposed parallel to said photodiode arrays with said photodiode arrays therebetween for transferring electrical charges generated by said arrays from the potential wells wherein the potential wells of the photodiodes of the photodiode array from detecting the smallest quantity of light have potentials smaller in magnitude than the potentials of the potential wells of the photodiodes of the other two photodiode arrays after transfer of electrical charges by said at least two charge transfer means.

5. An image sensor comprising:

first, second, and third photodiode arrays, each array comprising a plurality of photodiodes for generating charges in response to incident light, each of said photodiodes having a potential well, said arrays being aligned in parallel along a main scanning direction and perpendicular to a sub-scanning direction for detecting three different colors of incident light, respectively, said second photodiode array for detecting the smallest quantity of incident light being disposed between said first and third photodiode arrays, a transfer gate being disposed between said second and third photodiode arrays, potential wells of said photodiodes of said second photodiode array having potentials smaller in magnitude, i.e., being shallower, than potential wells of said photodiodes of said third photodiode array after transfer of electrical charges from said second and third photodiode arrays;

first transfer means for serially transferring and outputting charges generated by said second and third photodiode arrays disposed parallel and adjacent to said third photodiode array; and second transfer means for serially transferring and outputting charges generated by said first photodiode array disposed parallel and adjacent to said first photodiode array.

6. The image sensor of claim 5 wherein said first, second, and third photodiode arrays detect three different colors of light in a complementary color series.

7. The image sensor of claim 5 wherein said first, second, and third photodiode arrays detect three different colors of light in a primary color series.

* * * * *